United States Patent
Masuda et al.

(10) Patent No.: US 7,295,769 B2
(45) Date of Patent: Nov. 13, 2007

(54) REPRODUCTION METHOD FOR LENS-FITTED PHOTO FILM UNIT

(75) Inventors: Takeshi Masuda, Minami-Ashigara (JP); Nobuyuki Kameyama, Minami-Ashigara (JP)

(73) Assignee: Fujifilm Corporation, Tokyo (JP)

(*) Notice: Subject to any disclaimer, the term of this patent is extended or adjusted under 35 U.S.C. 154(b) by 268 days.

(21) Appl. No.: 11/200,151

(22) Filed: Aug. 10, 2005

(65) Prior Publication Data
US 2006/0045497 A1 Mar. 2, 2006

(30) Foreign Application Priority Data
Aug. 31, 2004 (JP) ............... 2004-253014

(51) Int. Cl.
*G03B 17/02* (2006.01)
(52) U.S. Cl. ........................................ 396/6
(58) Field of Classification Search ............... 396/6
See application file for complete search history.

(56) References Cited

U.S. PATENT DOCUMENTS

2006/0045496 A1* 3/2006 Masuda et al. ............... 396/6

* cited by examiner

*Primary Examiner*—Christopher Mahoney
(74) *Attorney, Agent, or Firm*—Young & Thompson (57) ABSTRACT

In a reproduction method for lens-fitted photo film units, a roll of high-speed photo film of ISO1600 or more is loaded in a new film unit body, so as to produce a lens-fitted photo film unit that is improved in imaging characteristics for a low brightness scene with regard to its background. After being used up, the high-speed film is unloaded for development, and the emptied film unit body is recovered for recycling. In a recycling line, a roll of standard-speed photo film of ISO400 is loaded in a reproduced film unit body, so as to be sold as another type lens-fitted photo film unit that is improved in imaging characteristics in a background area of a high brightness scene.

6 Claims, 8 Drawing Sheets

REPRODUCTION METHOD FOR LENS-FITTED PHOTO FILM UNIT

FIELD OF THE INVENTION

The present invention relates to a reproduction method for lens-fitted photo film units that are a kind of single-use handy camera preloaded with a roll of unexposed photo film.

BACKGROUND ARTS

The lens-fitted photo film units are widely used because they are economical and easy to handle thanks to their simple photographic mechanisms such as a shutter mechanism and a film winding mechanism.

With the wide spread of the lens-fitted photo film units, a variety of film units adapted to many photographic scenes have been developed and sold, such as ones for night-view, ones for close-up shooting, ones for telephotography, and ones for sequential shooting. Recently, such film units that can switch over photography modes have been brought into the market. As such a film unit, an article named "Night & Day (a trade name)", which is loaded with high-speed photo film of ISO1600 or more, is produced and sold by the present applicant.

Out of concern for environmental problems, a recycling system for the lens-fitted photo film units have already been adopted, whereby used-up film units are recovered after the development process in photo-labs by their own manufacturers, and are processed to be reproduced and sold as recycled film units. The production processes include sorting and disassembling film unit bodies, inspecting reusable parts, reassembling and reloading the lens-fitted photo film unit bodies. In order to reproduce film units with equal quality to new ones from used-up film units, it takes enormous cost for the inspection and repair of reusable parts, so that the recycling cost becomes equal to or even higher than the cost for manufacturing new film units.

To save the recycling cost, many solutions have been suggested. For example, the proportion of reusable parts of the lens-fitted photo film unit is raised by unitizing its components such as a lens mechanism and a flash device. Or the proportion of recyclable parts is raised by transforming plastic parts of the used film unit, such as front and rear covers, into pellets that are used as materials for forming these parts.

However, there is another factor that raises the recycling cost. As the last stage of recycling process of the lens-fitted photo film units, some of the lens-fitted photo film units as reassembled and reloaded with a new roll of photo film each, are picked up and subjected to a vibration test, a light leakage test, an actual shooting test and the like. Although such sampling is generally carried out also at the last stage of manufacturing new film units, the proportion of defective ones found by the sampling of the reassembled film units is higher than in the new film units. If any defect is found, the photo film loaded in the defective film unit is thrown away in vain. Especially where the defective film unit is loaded with high-speed film of ISO1600 or more, which is expensive in comparison with standard-speed film of ISO400 or so, such a waste of new photo film greatly increases the recycling cost of the lens-fitted photo film unit.

SUMMARY OF THE INVENTION

In view of the foregoing, a primary object of the present invention is to provide a method of recycling film units, whereby the recycling cost is reduced effectively.

To achieve the above and other objects, the present invention suggests a reproduction method for lens-fitted photo film units that are each preloaded with a roll of photo film and provided with simple photographic mechanisms, the method comprising steps of:

loading high-speed photo film of ISO1600 or more in a new film unit body, to be produced as a first type lens-fitted photo film unit;

recovering the film unit body after the high-speed photo film is exposed and unloaded; and reloading the recovered film unit body with standard-speed photo film of ISO800 or less, to be reproduced as a second type lens-fitted photo film unit.

According to a preferred embodiment, the high-speed photo film has a film speed of ISO3200, whereas the standard-speed photo film has a film speed of ISO400.

It is preferable to provide the film unit body with a photography mode switching device for switching between a first photography mode where the film unit body has an aperture size of f/16.0 in f-number and a shutter speed of 1/100 seconds, and a second photography mode where the film unit body has an aperture size of f/4.0 in f-number and a shutter speed of 1/45 seconds.

It is also preferable to provide the film unit body with a flash device and a photography mode switching device for switching between first, second and third photography modes, wherein the photography mode switching device provides an aperture size of f/16.0 in f-number and a shutter speed of 1/100 seconds and turns the flash device OFF in the first photography mode, provides an aperture size of f/5.6 in f-number and a shutter speed of 1/100 seconds and turns the flash device ON in the second photography mode provides, and provides an aperture size of f/4.0 in f-number and a shutter speed of 1/45 seconds and turns the flash device ON in the third photography mode.

BRIEF DESCRIPTION OF THE DRAWINGS

The above and other objects and advantages will be more apparent from the following detailed description of the preferred embodiments when read in connection with the accompanied drawings, wherein like reference numerals designate like or corresponding parts throughout the several views, and wherein.

DESCRIPTION OF THE PREFERRED EMBODIMENTS

Figure 1:
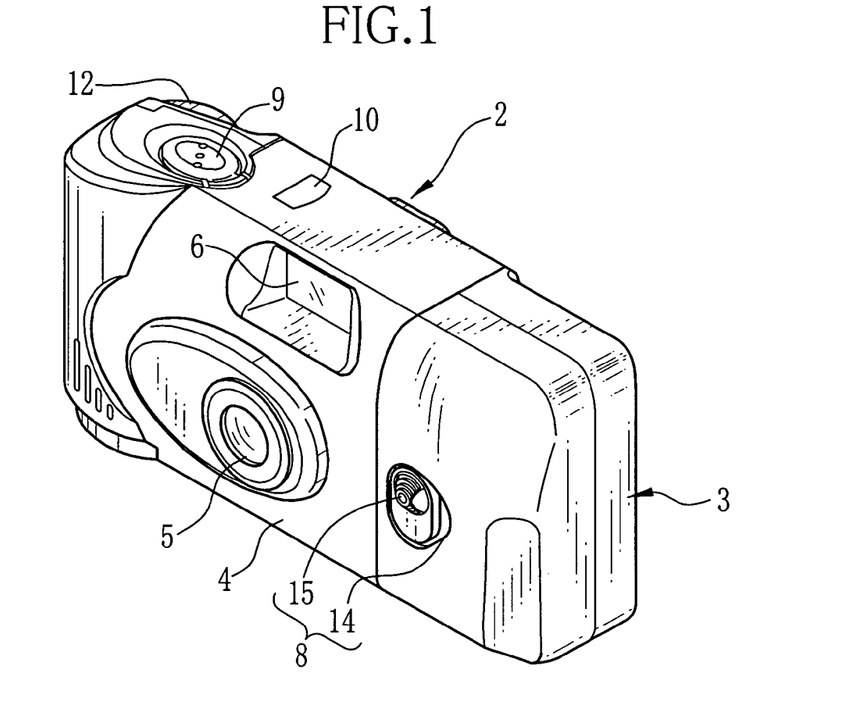
FIG. 1 is a perspective view of a lens-fitted photo film unit in a first photography mode.

FIG. 1 shows an external view of a lens-fitted photo film unit according to an embodiment of the present invention. The lens-fitted photo film unit 2 consists of a unit body 3 incorporating various photographic mechanisms, a film cartridge loaded in the unit body 3 in the factory and an attached label 4 wrapping around outer circumference of the unit body 3. The label 4 has apertures to expose some parts of the unit body 3.

The unit body 3 is provided with a taking lens 5, a viewfinder 6, and a photography mode selector 8 at the front. The unit body 3 has a shutter button 9 and an exposure counter window 10 on the top. A part of a film winding wheel 12 exposes from the back of the unit body 3.

Figure 2:
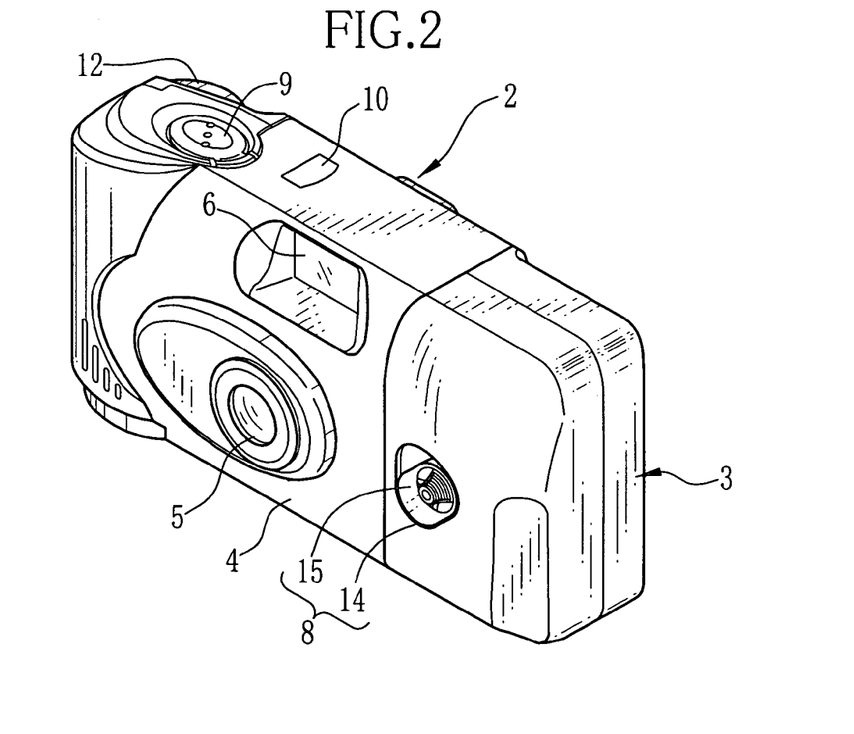
FIG. 2 is a perspective view of the lens-fitted photo film unit in a second photography mode.

The photography mode selector 8 consists of an operation aperture 14 formed at the front of the unit body 3 and an almost oval operation member 15 which is movable within the operation aperture 14. The operation member 15 as a photography mode selecting member moves between a first operational position shown in FIG. 1 and a second operational position turned clockwise from the first operational position, as shown in FIG. 2.

When the operation member 15 is in the first operational position, the lens-fitted photo film unit 2 is in a first photography mode with a small aperture and a high shutter speed. When the operation member 15 is in the second operational position, the lens-fitted photo film unit 2 is in a second photography mode with a large aperture and the high shutter speed. It is possible to provide some indication in the viewfinder 6 to allow the photographer to know while looking through the viewfinder 6 whether the lens-fitted photo film unit 2 is set in the first photography mode or the second photography mode.

Figure 3:
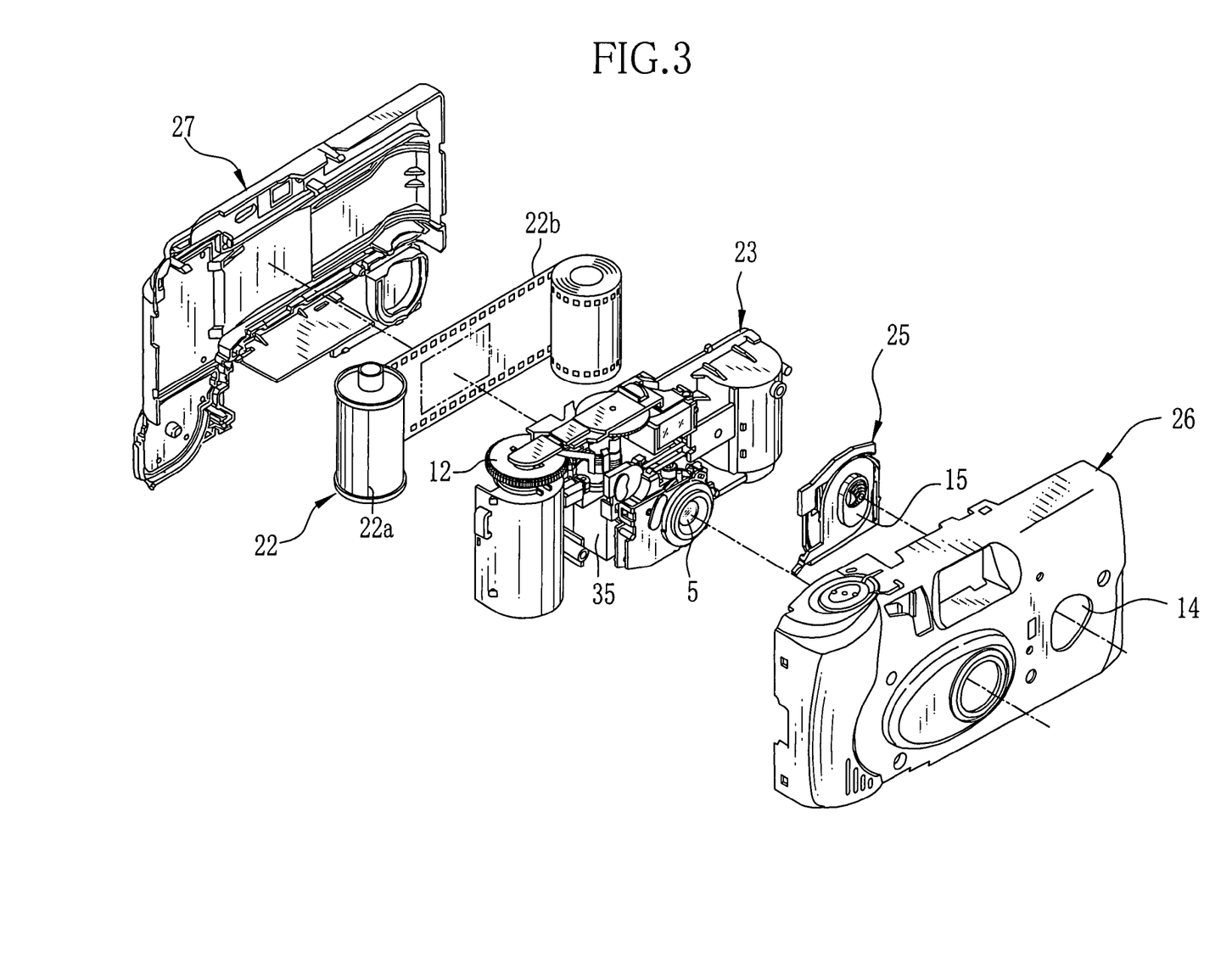
FIG. 3 is an exploded perspective view of the lens-fitted photo film unit of FIG. 1.

FIG. 3 shows a structure of the unit body 3. The unit body 3 consists of a body base 23 loaded with a 135-type film cartridge 22, a photography mode switching device 25, a front cover 26 and a rear cover 27 mounted to the front and back of the body base 23. The film cartridge 22 may be an IX240 type or a Brownie type.

The film cartridge 22 consists of a photo film 22b and a cartridge shell 22a. As the photo film 22b, a high-speed film of ISO3200 or a standard-speed film of ISO400 maybe alternatively loaded in the body base 23 in the factory, to produce a first type or a second type of lens-fitted photo film unit whose proper exposure values are different from each other.

At the center front of the body base 23, an image tunnel 35 is provided. Around the image tunnel 35, a shutter charging mechanism, a shutter mechanism, a film winding mechanism, a film winding-lock mechanism, a frame counter mechanism, an imaging optical system, a viewfinder optical system, the photography mode switching device 25 constituted of an aperture size switching mechanism and a shutter speed switching mechanism are mounted.

Figure 4:
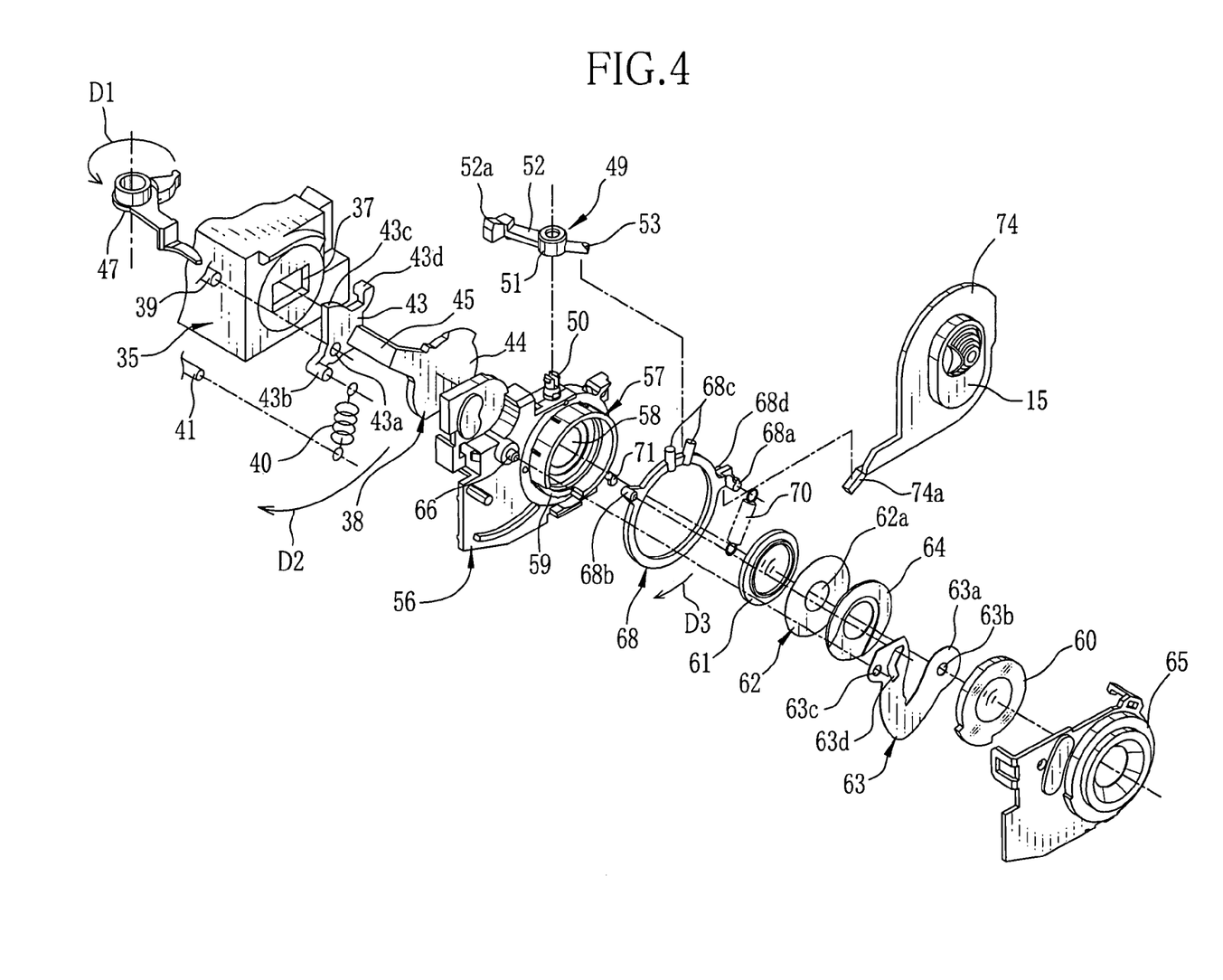
FIG. 4 is an exploded perspective view illustrating an aperture size and shutter speed switching mechanism of the lens-fitted photo film unit of FIG. 1.

FIG. 4 is an exploded perspective view illustrating the shutter mechanism, the aperture size switching mechanism, the shutter speed switching mechanism and the imaging optical system built in around the image tunnel 35. At the front of the image tunnel 35, a rectangle picture aperture 37 is formed. At the side, a pin 39 which pivotally holds a shutter blade 38 and another pin 41 on which an end of a spring 40 is hooked are provided.

The shutter blade 38 of the shutter mechanism consists of a base section 43 which forms a hole 42a for insertion of the pin 39, a blade section 44 which is arranged in front of the picture aperture 37 and opens and closes the picture aperture 37, and a connecting section 44 between the base section 43 and the blade section 44. The base section 43 is provided with a pin 43b on which the other end of the spring 40 is hooked, a projection 43c kicked by a shutter drive lever 47 and a speed control projection 43d. The shutter blade 38 is hold in a closing position to cover in the picture aperture 37 with bias of the spring 40.

The shutter drive lever 47, a part of the shutter mechanism, turns in an opposite direction to an arrow D1 in the drawing by the shutter charging mechanism and is set in a charging position. And responding to the shutter release button 9 being pressed, the shutter drive lever 47 turns in a direction of the arrow D1 toward a charge releasing position and kicks the projection 43c of the shutter blade 38 during the turn. As being kicked by the shutter drive lever 47, the shutter blade 38 swings in an opposite direction to an arrow D2 in the drawing against the bias of the spring 40, fully opens the picture aperture 37 and then returns to the closing position with the bias of the spring 40. Via the full-open position where the picture aperture 37 fully opens, the shutter blade 38 can swing to a terminal position where it contacts with a stopper pin 56a (see FIGS. 5 and 6) provided inside a lens holder 56.

On the top of the lens holder 56, a pin 50 which pivotally holds a stop lever 49 is formed. The stop lever 49 consists of a boss 51 held by the pin 50 and arms 52 and 53 protruded from the side of the boss 51. A top of the arm 52 is provided with a pad 52a.

The stop lever 49 turns between a high shutter speed position where the pad 52a is in a moving track of the speed control projection 43d of the shutter blade 38, and a low shutter speed position where the pad 52a is retracted from the moving track of the speed control projection 43d.

Figure 5:
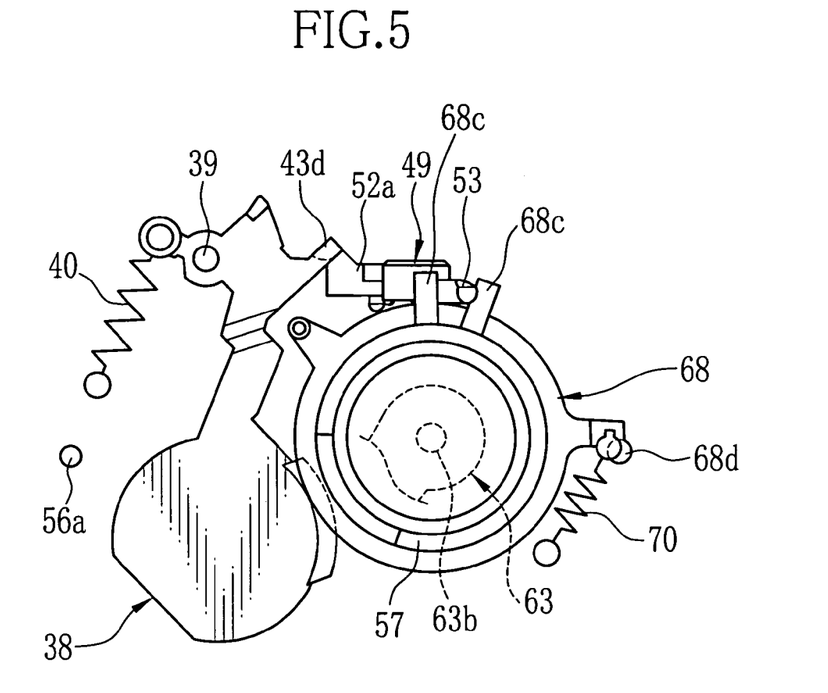
FIG. 5 is an explanatory diagram illustrating a shutter release operation in a high shutter speed position of the aperture size and shutter speed switching mechanism.

While the stop lever 49 is in the high shutter speed position as shown in FIG. 5, since the speed control projection 43d of the shutter blade 38 comes into contact with the pad 52a, the swing of the shutter blade 38 is stopped on the way from the full-open position to the terminal position. For this reason, the shutter blade 38 returns to the closing position in a short time, providing a high shutter speed of 1/100 sec. for the first photography mode.

Figure 6:
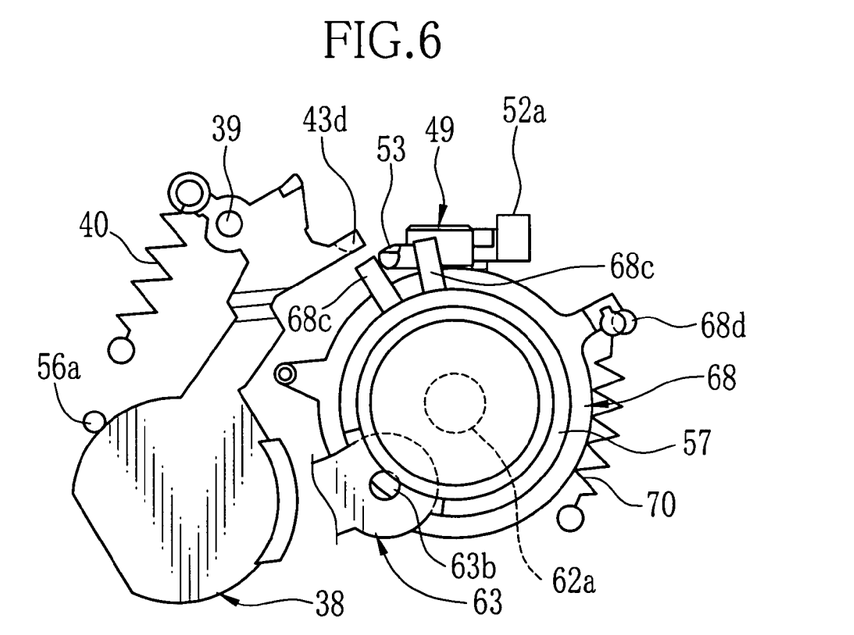
FIG. 6 is an explanatory diagram illustrating a shutter release operation in a low shutter speed position of the aperture size and shutter speed switching mechanism.

When the stop lever 49 is in the low shutter speed position as shown in FIG. 6, the shutter blade 38 can swing to the terminal position, without being stopped by the pad 52a. As a result, it takes longer for the shutter blade 38 to return to the closing position, providing a lower shutter speed of 1/45 sec. for the second photography mode.

As shown in FIG. 4, the lens holder 56 is mounted in front of the image tunnel 35. At the center front of the lens holder 56, a tubular lens barrel 57 is formed. An aperture 58 is formed inside the lens barrel 57, and a notch 59 on the side of the lens barrel 57. A first lens 60 and a second lens 61 constituting the taking lens 5 are housed in the lens barrel 57. Between the first and second lenses 60 and 61 are held a large aperture blade 62, an aperture size switching blade 63, and a spacer 64 to ensure a space for the insertion of the aperture size switching blade 63. To the front of the lens holder 56 is attached a lens holder plate 66 in order to prevent the taking lens 5 and other parts housed in the lens barrel 57 as well as a switching ring 68 mounted around the lens barrel 57 from dropping off.

The large aperture blade 62, the aperture size switching blade 63, the spacer 64 and the switching ring 64 constitute the aperture size switching mechanism. The large aperture blade 62 is a circular blade having a large stop aperture 62a in the center. The large stop aperture 62a has a large diameter corresponding to an aperture size of f/4.0 in f-number, that is used for the second photography mode.

The aperture size switching blade 63 is a blade having an elbow, and a small aperture section 63a on one end that is sized to cover up the large stop aperture 62a. The small aperture section 63a is formed with a small stop aperture 63b whose diameter corresponds to a small aperture size of f/16.0 in f-number that is used for the first photography mode. A hole 63c and a crooked slot 61d are formed on an opposite end of the aperture size switching blade 63. The hole 63c is pivotally fit on a pin 66 formed near the lens barrel 57 of the lens holder 56, allowing the aperture size switching blade 63 to swing about the pin 66.

The aperture size switching blade 63 swings between a small aperture position where the small aperture section 63a is located on an optical axis of the taking lens 5, and a large aperture position where the small aperture section 63a retreats from the notch 59 to outside of the lens barrel 57 to expose the large stop aperture 62a. Since the large stop aperture 62a and the small stop aperture 63b are located on the optical axis of the taking lens 5 in the small aperture position, the amount of light is limited by the small stop aperture 63b.

The switching ring 68 is fit on and turns around outer circumference of the lens barrel 57. The switching ring 68 is provided with a pin 68a where an end of a spring 70 is hooked, a link pin 68b which is inserted into the slot 63d of the aperture size switching blade 63, a pair of nipping pins 68c which nip the other arm 53 of the stop lever 49, and a driven pin 68d protruded to the back side.

The spring 70 biases the switching ring 68 to turn in a direction of an arrow D3 in the drawing, with one end being hooked on a pin 71 formed at a lower front position of the lens holder 56. The switching ring 68 biased by the spring 70 is held in a given position by the aperture size switching blade 63.

The operation member 15 is integrated with an almost oval switching blade 74 which is integrated with a press lever 74a protruded in a horizontal direction. When the operation member 15 turns from the first operational position to the second operational position, the press lever 74a presses the driven pin 68d of the switching ring 68. As a result the switching ring 68 turns in an opposite direction to the direction of the arrow D3 against the bias of the spring 70.

Figure 7:
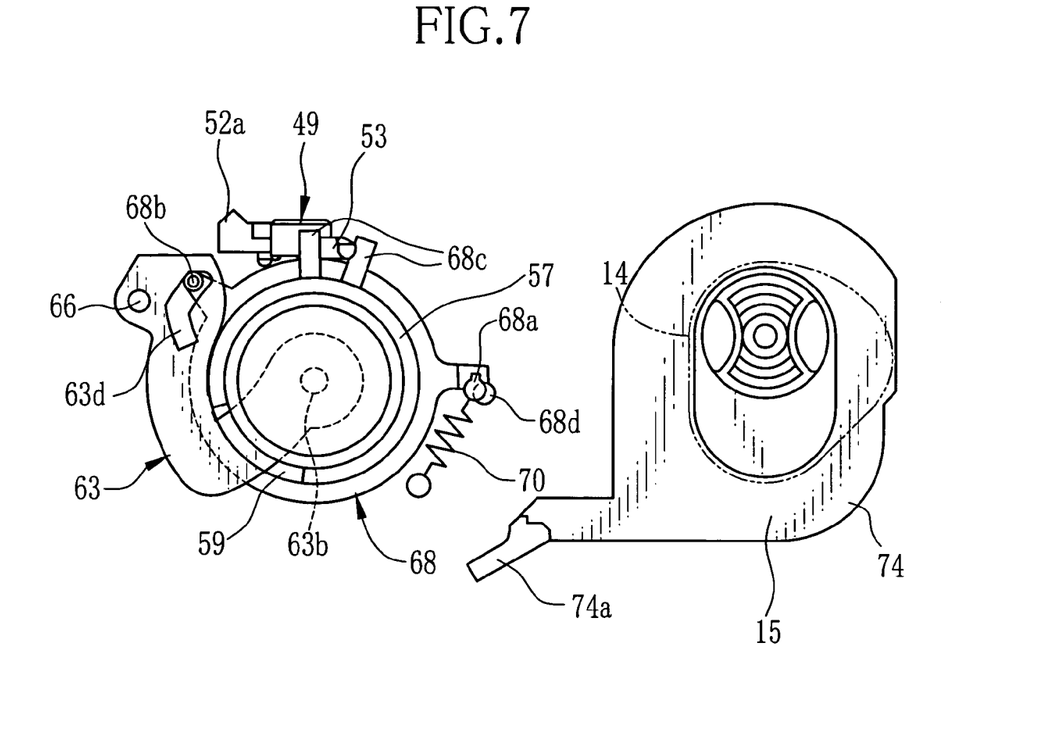
FIG. 7 is an explanatory diagram illustrating the aperture size and shutter speed switching mechanism in the first photography mode.
Figure 8:
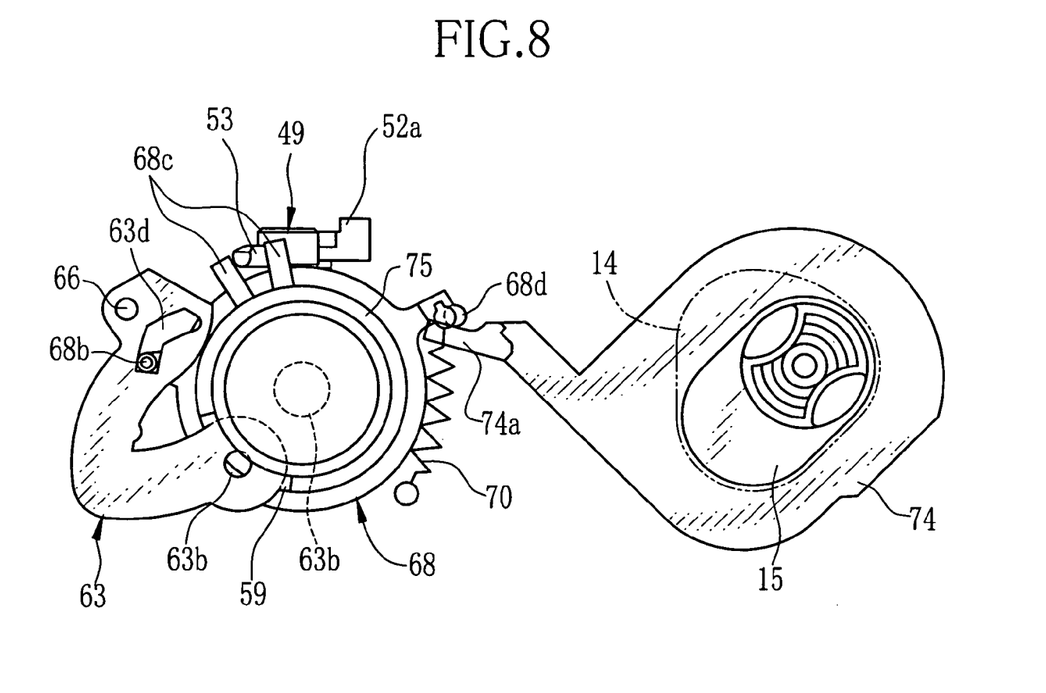
FIG. 8 is an explanatory diagram illustrating the aperture size and shutter speed switching mechanism in the second photography mode.

FIGS. 7 and 8 illustrate a state of the switching ring 68 in the first photography mode and that in the second photography mode respectively. When the operation member 15 is in the first operational position, the press lever 74a is not in contact with the driven pin 68d of the switching ring 68, so the switching ring 68 is held in an initial position by the aperture size switching blade 63.

When the switching ring 68 is in the initial position, the small aperture section 63a of the aperture size switching blade 63 is inserted into the lens barrel 57 through the engagement between the link pin 68b and the slot 63d. This provides the small aperture state where the quantity of light is limited at the small stop aperture 63b. Simultaneously, the nipping pins 68c hold the stop lever 49 in the high shutter speed position.

On the other hand, when the operation member 15 is turned from the first operational position to the second operational position, as shown in FIG. 8, the press lever 74a presses the driven pin 65d from below against the bias of the spring 70, causing the switching ring 68 to turn counterclockwise in the drawing. With the turn of the switching ring 68, the aperture size switching blade 63 pressed by the link pin 68b turns clockwise in the drawing, causing the small aperture section 63a to retreat from the optical axis of the taking lens 5, providing the large aperture state. And the pair of nipping pin 68c hold the stop lever 49 in the low shutter speed position. Thus, the first photography mode is switched to the second photography mode.

Now the production processes and the recycling processes of the lens-fitted photo film unit 2 will be described.

Figure 9:
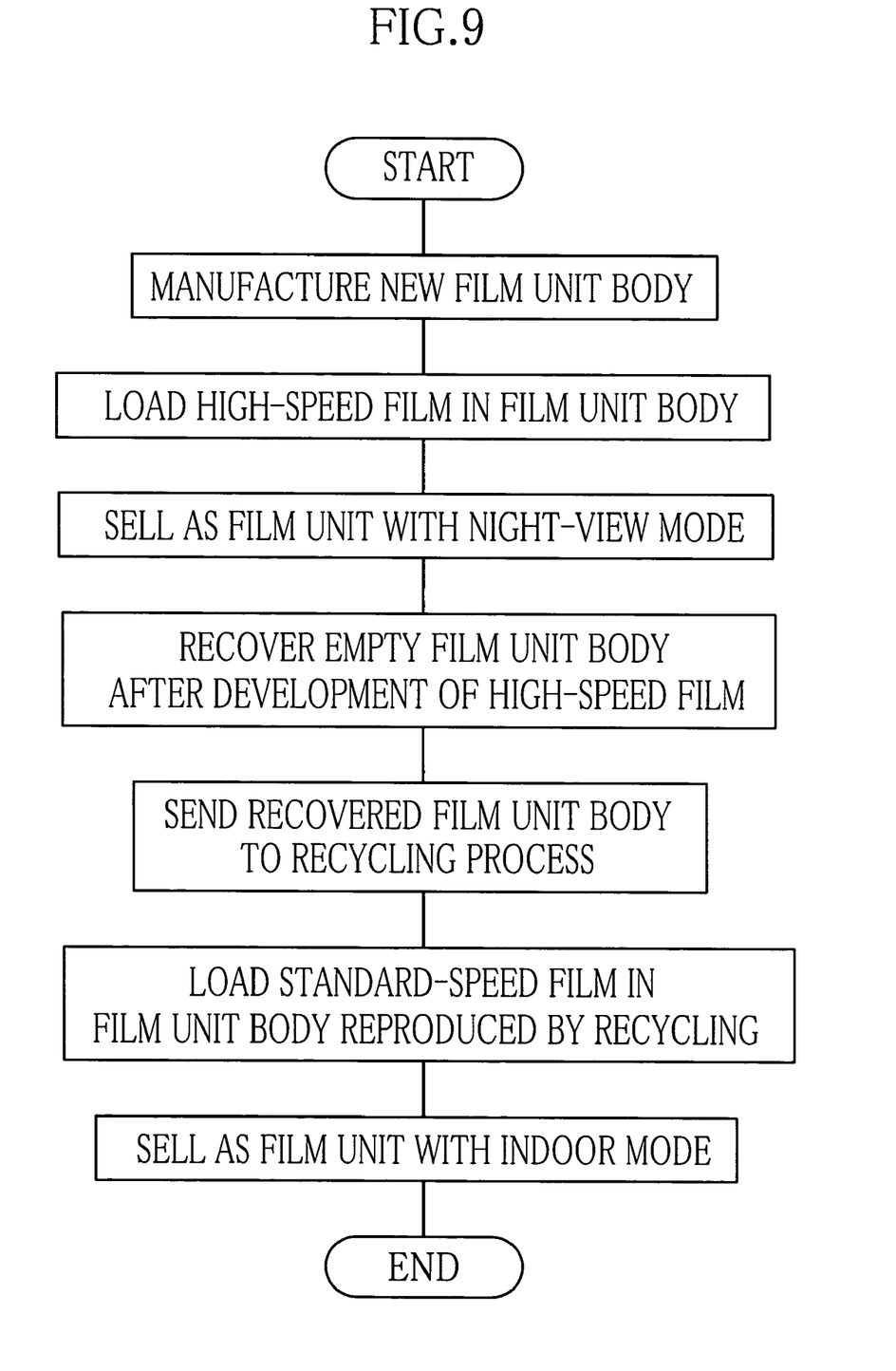
FIG. 9 is a flowchart illustrating the manufacturing process of the lens-fitted photo film unit.

First, the film unit body 3 configured as above is newly produced. Then the film unit body 3 is loaded with a high-speed film of ISO3200. As containing the ISO3200 film, a proper exposure value of the lens-fitted photo film unit 2 is EV9.6 for the first photography mode, and is EV4.5 for the second photography mode. Therefore, with the ISO3200 film, the first photography mode is adapted for daylight photography, whereas the second photography mode is adapted for photography in dark places such as night-view photography. These proper exposure values are calculated based on a film speed of ISO100 according to the following formula:

$$EV = \log_2 (F^2/T) - \log_2(S/100)$$

wherein EV represents a proper exposure value, F an f-number, T a shutter speed (second), and S a film speed.

As being loaded with the high-speed film, the label 4 put around the film unit body 3 contains corresponding information, and packaged to be sold as the lens-fitted photo film unit 2 with night-view mode.

After being used up, the lens-fitted photo film unit 2 is usually forwarded to a photo-finisher or a photo-lab. Then, the film cartridge 22 containing the exposed film 22b is unloaded from the film unit body 3, to develop the film 22b and make photo-prints from the developed film 22b. The emptied film unit body 3 is recovered by the manufacturer of the lens-fitted photo film unit 2, and is put into the recycling process.

In the recycling process, the recovered film unit body 3 is disassembled and sorted into parts to be recycled as materials, including the front and rear covers 26 and 27, and those to be reused as they are, including the body base 23 and the mode switching mechanism 25. The parts to be recycled are smashed and recycled as materials for forming designated parts. The parts to be reused are sorted into individual components and subjected to respective inspection processes. If necessary, the parts to reuse are repaired. The recycled parts and the reused parts are then reassembled into the film unit body 3.

The film unit body 3 as reassembled is loaded with a roll of standard-speed photo film, e.g. ISO400 film, to be reproduced as another type film unit. In that case, the proper exposure value calculated according to the above formula is EV12.6 in the first photography mode, and is EV7.5 in the second photography mode. Therefore, with the ISO400 film, the first photography mode is adapted for outdoor photography in sunny days, whereas the second photography mode is adapted for indoor photography. Accordingly, the lens-fitted photo film unit obtained by loading the standard-speed film in the reassembled film unit body 3 can be sold as a type that is improved in imaging characteristics in a background area of a bright scene, and is also provided with an indoor mode.

As being loaded with the standard-speed film, the film unit body 3 is labeled and packaged as a type with indoor mode. The film unit obtained in this way has an equal quality to new ones. As mentioned above, in either the production process of new film units or the reproduction process of the lens-fitted photo film units, sampling is always carried out at the last stage, by picking up some of the complete film units, and subjecting them to a vibration test, a light leakage test, an actual shooting test and the like.

Reproducing the lens-fitted photo film unit 2 in this way makes it possible to produce two types of film units having different proper exposure values from each other, one type through the manufacturing line for new products, the other through the recycling line. Thereby production efficiency improves in either line, saving the cost of manufacture. Loading inexpensive standard-speed film in the reproduced film unit body contributes to reducing the increase in the recycling cost that is resulted from the higher proportion of defective products found by the sampling at the last stage of the recycling line. Thus, the whole cost of recycling is reduced.

Since film units with indoor mode, as containing the standard-speed film, are cheaper and applicable to wider variety of photographic scenes, in comparison with the type with night-view mode which contain the high-speed film, the number of shipment of the lens-fitted photo film units with indoor mode have been greater than that of the lens-fitted photo film units with night-view mode. Therefore, manufacturing the lens-fitted photo film units with night-view mode as new products while recycling them as the lens-fitted photo film units with indoor mode not only contributes to reducing the requisite number of new products and thus saving the material cost for the new products, but also achieves stable supply of both types of articles with high efficiency.

Although the above described embodiment specifies an example of recycling process for film units without flash, the present invention is not to be limited to this embodiment, but is applicable to a recycling process for film units with flash. Now the second embodiment applied to film units with flash will be described with reference to FIGS. 10 to 12, wherein the same or like parts as those of the first embodiment will be designated by the same reference numerals, so the detailed description of these parts will be omitted.

Figure 10:
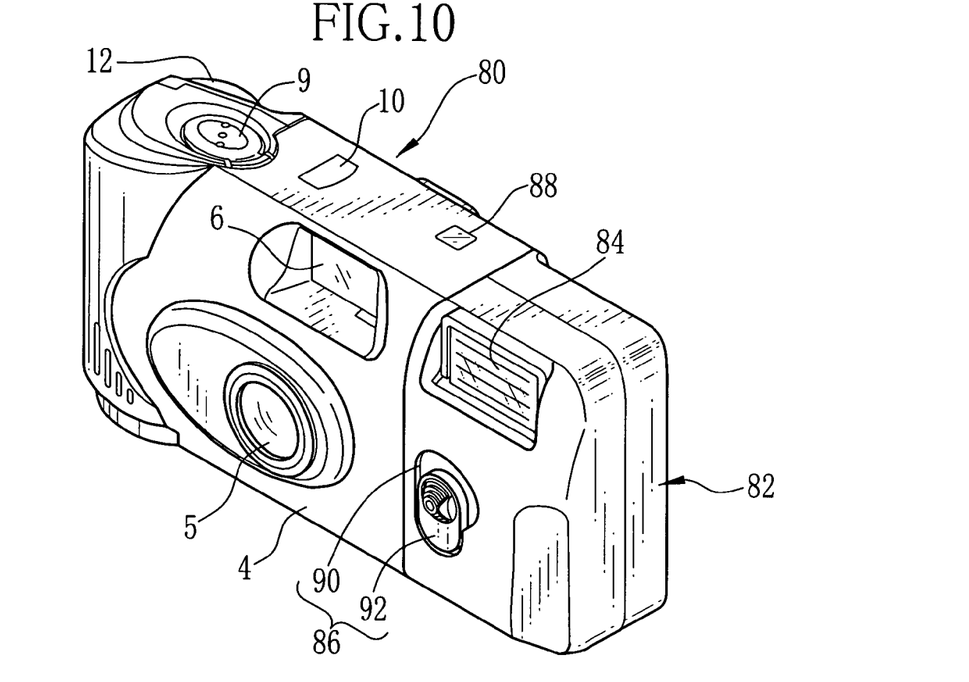
FIG. 10 is a perspective view of a lens-fitted photo film unit with a flash device in a first photography mode.

A lens-fitted photo film unit 80 has on its front a flash emitting portion 84 of a flash device for illuminating the subject and a photography mode selection device 86 with three switching positions. The lens-fitted photo film unit 80 also has on its top a signaling member 88 for indicating that the lens-fitted photo film unit 80 is ready to flash. Although the interior of the lens-fitted photo film unit 80 is not shown in the drawing, the lens-fitted photo film unit 80 is provided with an aperture size switching mechanism and a shutter speed switching mechanism, like the lens-fitted photo film unit 2 of the first embodiment.

Figure 11:
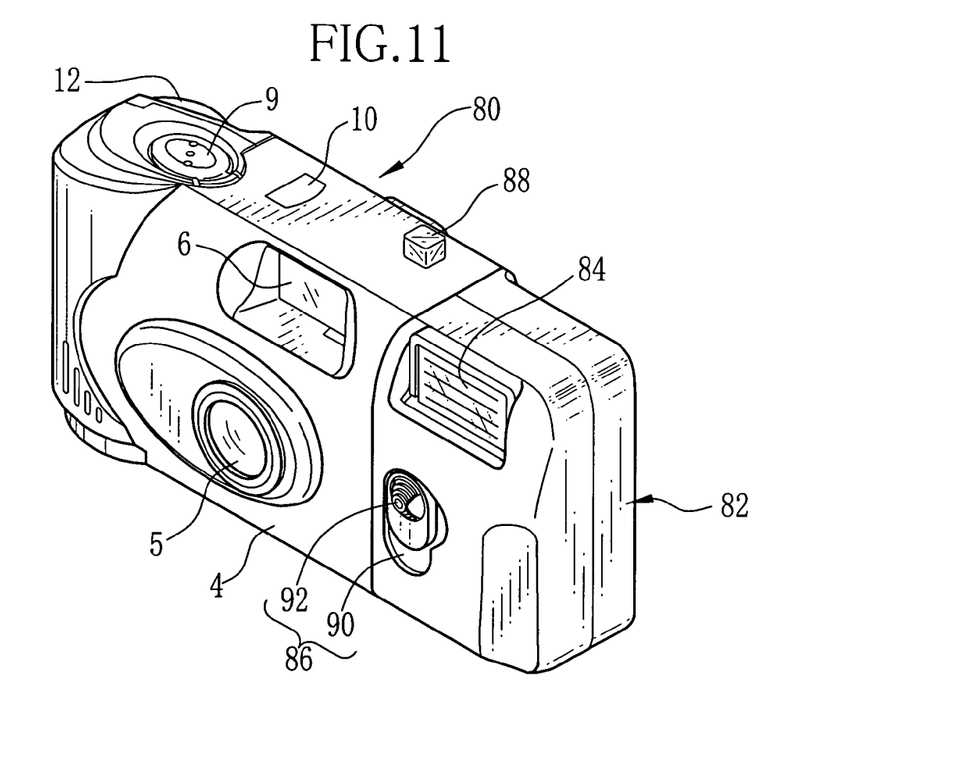
FIG. 11 is a perspective view of the lens-fitted photo film unit with the flash device in a second photography mode.
Figure 12:
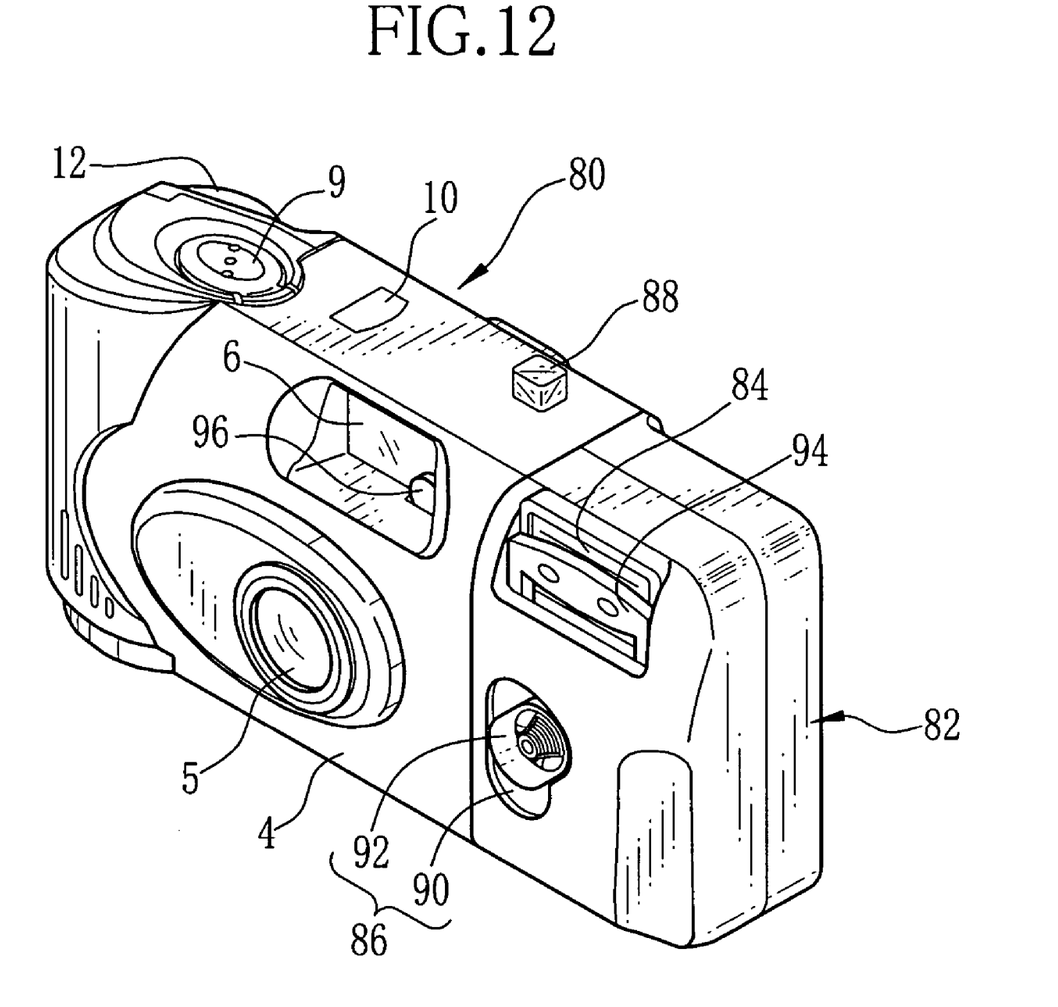
FIG. 12 is a perspective view of the lens-fitted photo film unit with the flash device in a third photography mode.

The photography mode selection member 86 is constituted of an operation opening 90 formed through the front of a film unit body 82, and an operation member 92 that is movable inside the operation opening 90. Specifically, the operation member 92 is movable between a first position located at a lower position of the operation opening 90, as shown in FIG. 10, a second position located at an upper position of the operation opening 90, as shown in FIG. 11, and a third position turned clockwise from the second position, as shown in FIG. 12.

Placing the operation member 92 at the first position sets the lens-fitted photo film unit 80 in a first photography mode where the flash device is turned OFF, the aperture size switching mechanism is set at a small aperture and the shutter speed switching mechanism sets a high speed. Placing the operation member 92 at the second position sets the lens-fitted photo film unit 80 in a second photography mode where the flash device is turned on, the aperture size switching mechanism is set at a middle aperture and the shutter speed switching mechanism is set at the high speed. In the second photography mode, the signaling member 88 protrudes out of the top of the lens-fitted photo film unit body 82. The signaling member 88 is a light guide that conducts light from a not-shown light emitting element, which starts lighting when the flash device completes charging, to notify the completion of charging.

While the operation member 92 is placed at the third position, the lens-fitted photo film unit 80 is set in a third photography mode where the flash device is turned ON, the aperture size switching mechanism is set at a large aperture size and the shutter speed switching mechanism is set at a low speed. In this third photography mode, a light reduction plate 94 moves up into front of the flash emitting portion 84, to reduce the volume of light projected toward the subject. Also an index member 96 protrudes into front of a viewfinder 6 in the third photography mode. So the photographer, as looking through the viewfinder 6, sees the index member 96, knowing that the lens-fitted photo film unit 80 is set to the third photography mode.

For example, the large aperture size is f/4.0, the middle aperture size is f/5.6, and the small aperture size is f/16.0 in f-number, whereas the high shutter speed is $\frac{1}{100}$ seconds, and the low shutter speed is $\frac{1}{45}$ seconds.

If the lens-fitted photo film unit body 82 is loaded with a high-speed film, a proper exposure value calculated based on the film speed of ISO100 as the standard, is EV9.6 in the first photography mode, EV6.6 in the second photography mode and EV4.5 in the third photography mode. So the first photography mode is adapted for daylight photography, the second photography mode is adapted for indoor photography,land the third photography mode is adapted for night-view photography.

On the other hand, if the lens-fitted photo film unit body 82 is loaded with a low-speed film, a proper exposure value calculated based on the film speed of ISO100 as the standard, is EV12.6 in the first photography mode, EV9.6 in the second photography mode and EV7.5 in the third photography mode. So the first photography mode is adapted for outdoor photography on sunny days, the second photography mode is adapted for outdoor photography on cloudy days, and the third photography mode is adapted to indoor photography.

As described so far, applying the reproduction method of the present invention to the lens-fitted photo film unit 80 with flash enables reproducing film units from film unit bodies of another type of film units, in the same way as for the first embodiment. So the second embodiment achieves the same effects as described with respect to the first embodiment.

It is to be noted that the above described recycling processes are carried out for reproducing the film unit body 3 or 82 with certified quality. So it is possible to reload standard-speed film in the used film unit body 3 or 82 from which exposed high-speed film is unloaded, without subjecting the film unit body 3 or 82 to the recycling process.

Although the present invention has been described with reference to the embodiments where the lens-fitted photo film units can switch over between two or three photography modes, the present invention is applicable to a recycling system for any type of film units, including one without a photography mode switching device.

Thus, the present invention is not to be limited to the above embodiments, but various modifications will be possible without departing from the scope of claims appended hereto.

What is claimed is:

1. A reproduction method for lens-fitted photo film units that are each preloaded with a roll of photo film and provided with simple photographic mechanisms, said method comprising steps of:

loading high-speed photo film of ISO1600 or more in a new film unit body, to be produced as a first type lens-fitted photo film unit;

recovering said film unit body after said high-speed photo film is exposed and unloaded; and reloading said recovered film unit body with standard-speed photo film of ISO800 or less, to be reproduced as a second type lens-fitted photo film unit.

2. A reproduction method for lens-fitted photo film units as claimed in claim 1, wherein said high-speed photo film has a film speed of ISO3200, whereas said standard-speed photo film has a film speed of ISO400.

3. A reproduction method for lens-fitted photo film units as claimed in claim 1, wherein said film unit body is provided with a photography mode switching device for switching between a first photography mode where said film unit body has an aperture size of f/16.0 in f-number and a shutter speed of $1/100$ seconds, and a second photography mode where said film unit body has an aperture size of f/4.0 in f-number and a shutter speed of $1/45$ seconds.

4. A reproduction method for lens-fitted photo film units as claimed in claim 1, wherein said film unit body is provided with a flash device and a photography mode switching device for switching between first, second and third photography modes, wherein said photography mode switching device provides an aperture size of f/16.0 in f-number and a shutter speed of $1/100$ seconds and turns said flash device OFF in said first photography mode, provides an aperture size of f/5.6 in f-number and a shutter speed of $1/100$ seconds and turns said flash device ON in said second photography mode provides, and provides an aperture size of f/4.0 in f-number and a shutter speed of $1/45$ seconds and turns said flash device ON in said third photography mode.

5. A reproduction method for lens-fitted photo film units as claimed in claim 1, further comprising steps of: disassembling said recovered film unit body;

sorting respective parts of said film unit body into reusable ones, unusable ones and ones to be recycled as materials;

reassembling said film unit body from reused and recycled parts; and loading said standard-speed photo film in said reassembled film unit body.

6. A reproduction method for lens-fitted photo film units as claimed in claim 1, wherein said film unit body is labeled as the first type after being loaded with said high-speed photo film, and as the second type after being loaded with said standard-speed photo film.

* * * * *